United States Patent [19]

Pressler

[11] Patent Number: 5,577,760
[45] Date of Patent: Nov. 26, 1996

[54] FARM WAGON STABILIZING BAR SYSTEM

[76] Inventor: Hallis R. Pressler, 2783 E. Old 24, Wabash, Ind. 46992

[21] Appl. No.: 519,796

[22] Filed: Aug. 28, 1995

[51] Int. Cl.⁶ .................................................. B60D 1/12
[52] U.S. Cl. .............................. 280/689; 280/457; 296/6; 296/204
[58] Field of Search .................................. 280/689, 457, 280/772, 760, 763.1, 766.1, 180; 296/6, 8, 204, 205

[56] References Cited

U.S. PATENT DOCUMENTS

| | | | |
|---|---|---|---|
| 3,782,759 | 1/1974 | Thune | 280/457 |
| 3,989,269 | 11/1976 | Rendessy | 280/457 X |
| 4,015,856 | 4/1977 | Smith | 280/457 X |
| 4,648,620 | 3/1987 | Nuss | 280/689 |
| 4,781,364 | 11/1988 | Finn et al. | 280/689 X |
| 5,074,587 | 12/1991 | Schwede et al. | 296/204 |
| 5,118,070 | 6/1992 | Reid | 248/635 |
| 5,165,306 | 11/1992 | Hellon | 74/588 |
| 5,217,248 | 6/1993 | Reast | 280/718 |
| 5,362,094 | 11/1994 | Jensen | 280/689 |

*Primary Examiner*—Christopher P. Ellis

[57] ABSTRACT

The invention is adapted for use on four wheel trailers that include strut supports for the axles. Each strut includes an extending tab between which are attached stabilizer bars connected to the front and rear struts on the same side. The stabilizer bars may be solid with a fixed clevis on each end or tubular with either fixed or adjustable clevises on each end. The stabilizing bars are attached with a connector pin passing through the clevis and the strut tab.

4 Claims, 2 Drawing Sheets

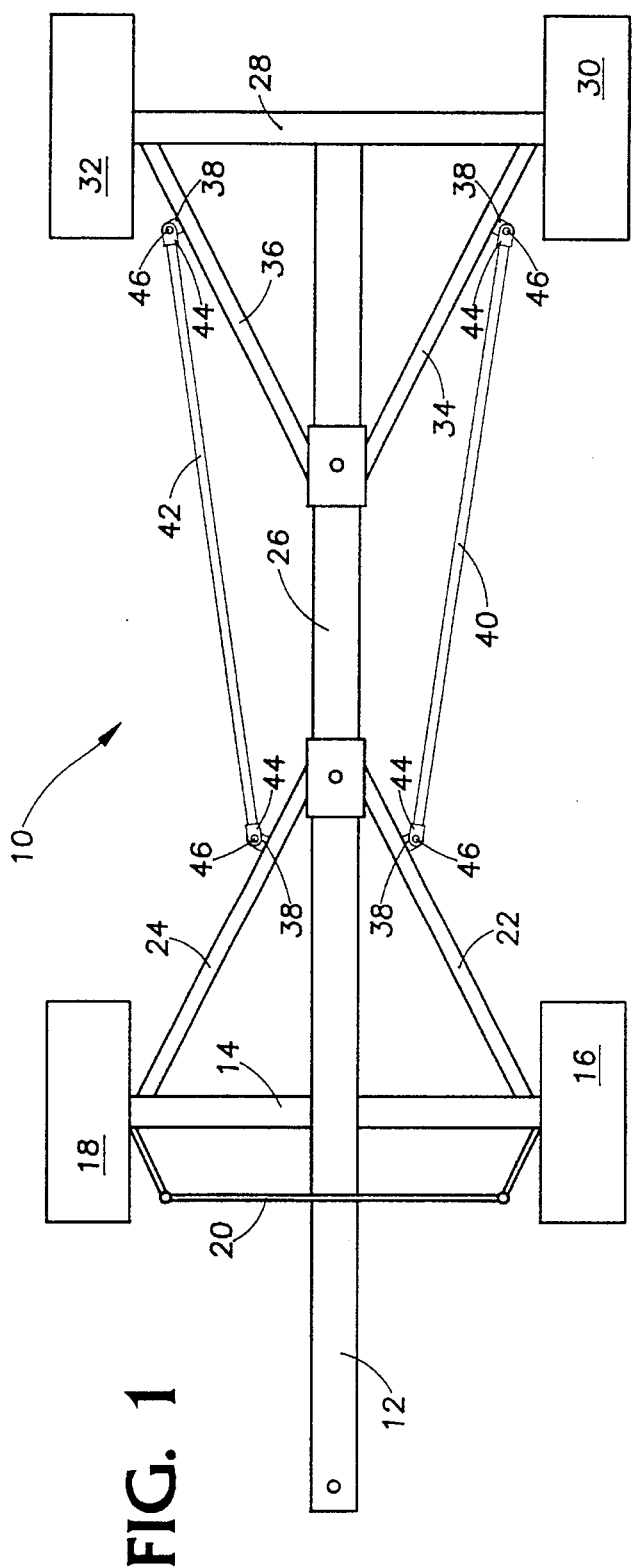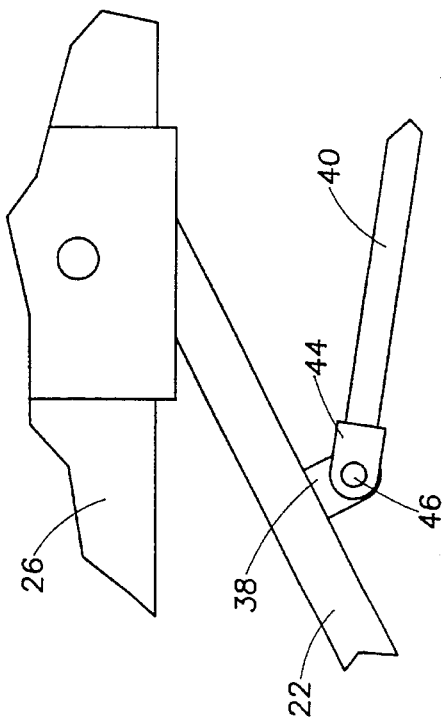

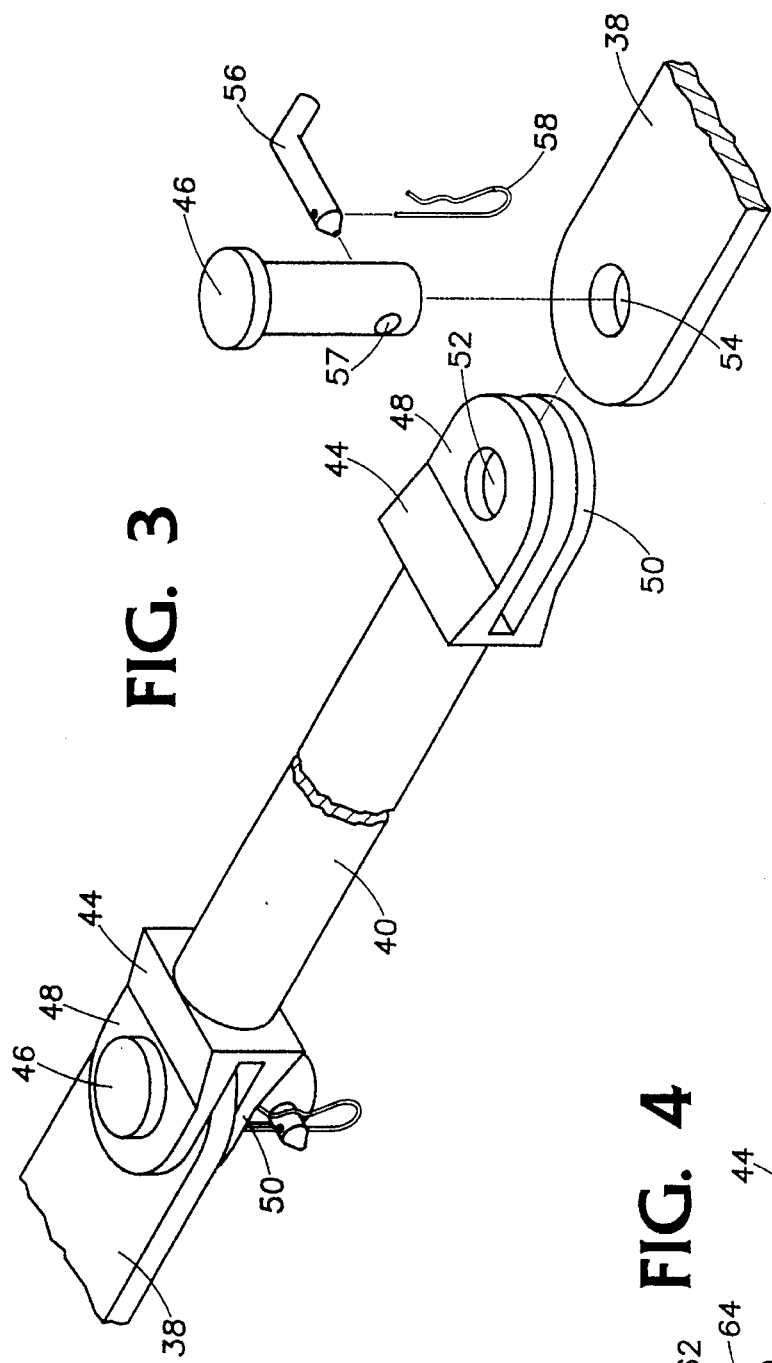
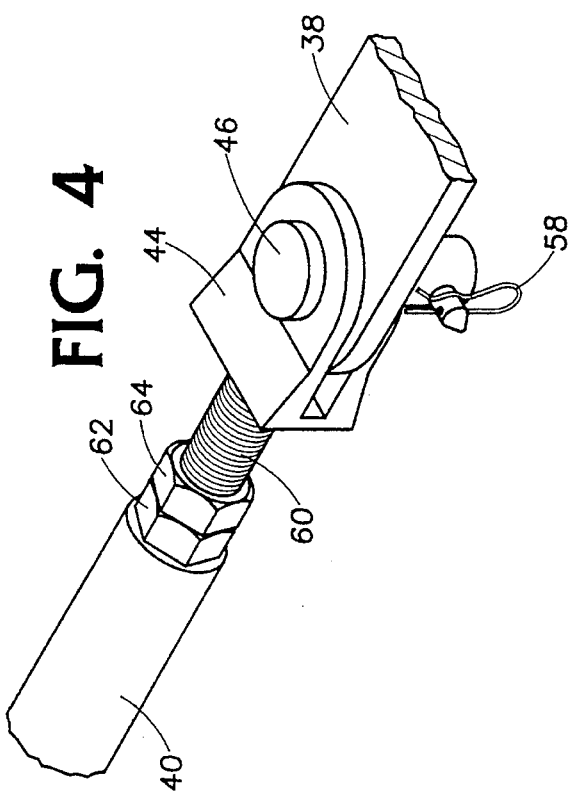

स्5,577,760

FARM WAGON STABILIZING BAR SYSTEM

BACKGROUND OF THE INVENTION

1. Field of the Invention

This invention relates generally to towed vehicles and in particular to and towed vehicles that are adapted to operate on and off the road.

2. The Problem and Relevant Prior Art

There has long been a problem in the agricultural equipment field relating to the dynamic weave that creates distress amongst farm workers when they are require to tow a wagon on a hard surface, dirt or black top. The problem is controlled to some degree by towing the wagon at a painfully slow speed, not much faster than one could tow the wagon across a hay field. The dynamic weave increases as the speed of the tow increases and as the load increases, it is believed to be caused by a flexing of the axles and main support beam. A loaded hay wagon can easily become so out of control from weaving that it will break or disengage the tow bar and dump the load.

The problem is, to a large extent, created from the oscillating motion in the front wheels acting out of phase with an oscillating motion occurring in the rear axle. The use of stabilizer bars as disclosed and claimed herein diminishes and eliminates the motion in the rear axle thereby eliminating one of the elements necessary in order to have the dynamic weaving condition.

The concept of stabilizer bars for assisting in the control of vehicles is not new, the prior art contains numerous types, styles and designs of such bars and ancillary equipment. Examples of prior art stabilizing equipment is disclose in issued U.S. Patents, for example; U.S. Pat. No. 4,648,620 issued Mar. 10, 1987 to Nubs for an adjustable suspension stabilizer bar that is connected to a vehicle frame and opposite ends of a vehicle axis in a fairly conventional manner, U.S. Pat. No. 5,118,070 issued Jun. 2, 1992 to Raid who discloses a rubber frame mount for a vehicle stabilizer connecting wheel suspension members on opposite sides of the vehicle, U.S. Pat. No. 5,165,306 issued Nov. 24, 1992 to Hellion for a vehicle stabilizer bar end link which includes a force absorbing and force transmitting arm having a ball stud connector at each end, U.S. Pat. No. 5,217,248 issued Jun. 8, 1993 to React discloses a heavy duty vehicle suspension system having a wheel set with a first and second suspension system including a stabilizer system and U.S. Pat. No. 5,362,094 issued Nov. 8, 1994 for a hydraulically controlled stabilizer bar system which includes a stabilizer bar connected to a support by a hydraulic actuator and an electronic controller to vary pressure in the actuator chambers.

The cited prior art taken alone or in combination along with the general knowledge of those skilled in the art fails to anticipate the invention contained and claimed in this disclosure.

SUMMARY OF THE INVENTION

The invention is a farm wagon stabilizing bar system particularly adaptable to a towed four wheel vehicle having no suspension and a simple under carriage. The front and rear axles are solid and attached to a single structural member midway between the wheels. The member continues to the draw bar and contains ancillary connections to operate the steerage of the front wheels. The front and rear axles are strengthened by the addition of struts which are connected between the distal ends of each axle and the structural member.

The stabilizer bars, unlike most stabilizer bars are connected between the wheel struts on the same side of the vehicle and act to interfere with the residual harmonics of the frame and support system causing wheel misalignment thus preventing dynamic vehicle weave. Tabs are attached by welding on each strut, the front moved slightly to the rear, proximate the main support beam. The rear tabs are as close as practically possible to the rear axle. The tabs contain a throughgoing aperture adapted to receive a clevis pin. The tabs on each side of the support member are connected by a stabilizer bar. The stabilizer bar is either adjustable or fixed in length. There are advantages to both types. The stabilizer bar is hollow and contains a clevis on each end designed and constructed to mate with the tab attached to the axle strut. A connecting pin engages the holes in the clevis and slides through the aperture in the tab. The connecting pin is locked in place with a hitch pin secured by a hair pin.

In one case, the stabilizer bar length is fixed and in another case the clevis ends of the stabilizer are threaded into the end of the bar using opposed threads which are secured by a lock nut to the end of the bar itself.

It is therefore an object of the invention to provide a new and improved farm wagon stabilizing bar system.

It is another object of the invention to provide a new and improved farm wagon stabilizing bar system that prevents wagon weave on hard surfaces.

It is a further object of the invention to provide a new and improved farm wagon stabilizing bar system that is fixed or adjustable.

It is still another object of the invention to provide a new and improved farm wagon stabilizing bar system that is simple and easy to install.

It is still a further object of the invention to provide a new and improved farm wagon stabilizing bar system which has all the advantages of similar prior art devices but none of the disadvantages.

It is another object of the invention to provide a new and improved farm wagon stabilizing bar system which is of a durable and reliable construction.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description make reference to the annexed drawings wherein:

FIG. 1 is a top plan view of a farm wagon with the body removed.

FIG. 2 is an enlarged section of the farm wagon structure, showing the connection between the invention and the strut of the structure.

FIG. 3 is a perspective view of the invention.

FIG. 4 is a perspective view of an alternative embodiment of the invention.

DETAILED DESCRIPTION OF A PREFERRED EMBODIMENT

Referring now to FIG. 1, the invention is shown generally at 10 and is assembled on the main support member of a farm wagon. The draw bar 12 is connected to the front axle 14. The axle 14 includes wheels 16 and 18 connected by a steering mechanism 20. Struts 22,24 are connected between the main support member 26 and the front axle 14. Main support member 26 terminates at the rear axle 28 having tires 30,32 and struts 34,36 connected between the main support member 26 and the rear axle 28. Tabs 38 are connected by welding to each axle strut and connect each respective stabilizer bar 40,42 to the strut by a clevis 44 engaging the tab and a connecting pin 46 passing through the clevis and an aperture in the tab operatively securing the connection.

FIG. 2 is an enlarged view of the connection of stabilizer bar 40 engaging strut 22 at a point proximate the connection with main support member 26. Tab 38 is affixed to strut 22 and clevis 44, one terminus of stabilizer bar 40, engages the tab and is held in position by connecting pin 46.

The stabilizer bar is shown in FIG. 3, the tubular stabilizer bar 40 contains a clevis 44 on each end. The clevis connectors lie in the same plane and as with conventional clevis include a pair of parallel ears 48 and 50. An aperture 52 in each ear allows a connecting pin 46 to pass through and engage the tab 38 which contains a mating aperture 54. Once assembled, a hitch pin 56 is inserted through the connecting pin aperture 57 to prevent the connecting pin from accidently being dislodged. Hair pin or safety pin 58 secures the hitch pin in place.

FIG. 4 discloses an alternative embodiment where the clevis 44 is adjustably connected to the stabilizing bar 40. A threaded shaft 60 extends from clevis 44 and engages nut 62 which is attached as by welding to the stabilizer bar 40. The lock nut 64 secures the clevis in place. There may be a threaded clevis on each end of the stabilizer bar in which case the threads will be opposed, that is a left hand thread on one clevis and a right hand thread on the other clevis. If only one clevis is threaded the thread would be conventional right hand.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A stabilizing bar apparatus, in combination with a four wheel trailer having a main support member and a front axle and a rear axle connected to the main support member and front struts and rear struts connected between each axle and the main support member, comprising:

a front aperture tab attached to projecting from each front strut and a rear aperture tab attached to and projecting from each rear strut;

a tab aperture in each front aperture tab and in each rear aperture tab;

a pair of adjustable length stabilizer bars;

the stabilizing bars having two ends;

a clevis threadingly attached to each of the ends of the stabilizing bars;

the clevis having a pair of parallel ears;

cooperating apertures in the parallel ears;

a removable connecting pin, removably inserted through the cooperating apertures and the tab aperture, for joining the clevis and the aperture tab; and one of the stabilizing bars connecting the front struts and the rear struts on one side of the main support member and another one of the stabilizing bars connecting the front struts and the rear struts on another side of the main support member to eliminate a dynamic weave caused by a wheel misalignment.

2. A stabilizing bar system according to claim 1 wherein the stabilizer bars are solid.

3. A stabilizing bar system according to claim 1 wherein the stabilizer bars are tubular.

4. A stabilizer bar system according to claim 1 wherein one clevis is fixed and one clevis is adjustable in length.

\* \* \* \* \*